United States Patent [19]

Shigematsu et al.

[11] Patent Number: 4,801,679
[45] Date of Patent: Jan. 31, 1989

[54] POLYFORMAL RESIN AND PROCESS FOR PRODUCING SAID RESIN

[75] Inventors: Kazuyoshi Shigematsu; Shigenori Shirouzu, both of Sodegaura, Japan

[73] Assignee: Idemitsu Kosan Co., Ltd., Tokyo, Japan

[21] Appl. No.: 146,244

[22] Filed: Jan. 20, 1988

[30] Foreign Application Priority Data

Feb. 4, 1987 [JP] Japan .................................. 62-22286

[51] Int. Cl.$^4$ ............................................. C08G 65/40
[52] U.S. Cl. ..................................... 528/219; 528/397
[58] Field of Search ................................ 528/219, 397

[56] References Cited

U.S. PATENT DOCUMENTS 4,260,733 4/1981 Loucks et al. ..................... 528/219

Primary Examiner—Harold D. Anderson
Attorney, Agent, or Firm—Frishauf, Holtz, Goodman & Woodward

[57] ABSTRACT

Polyformal resins having a repeating unit represented by the general formula:

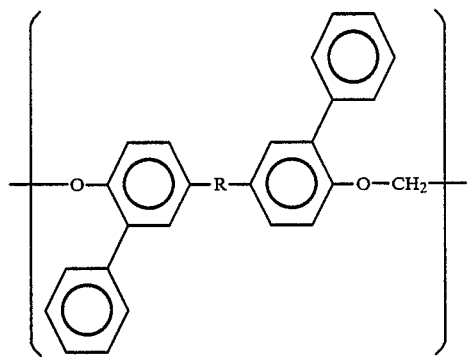

wherein the symbols are as defined in the appended claims and an intrinsic viscosity at 20° C. as a methylene chloride solution of at least 0.2 dl/g, and a process for efficiently producing the polyformal resins. The present polyformal resins are excellent in heat resistance and optical properties, and thus are useful as materials for production of optical instruments, for example.

9 Claims, No Drawings

POLYFORMAL RESIN AND PROCESS FOR PRODUCING SAID RESIN

BACKGROUND OF THE INVENTION

1. Field of the Invention

The present invention relates to novel polyformal resins and a process for producing said resins, and more particularly to polyformal resins having excellent heat resistance and optical properties, and a process for efficiently producing said resins.

2. Description of Related Art

Various polyformal resins have heretofore been known. Japanese Patent Application Laid-Open No. 125297/1979, for example, discloses polyformal resins having various chemical structures. A typical example is a polyformal resin produced from 2,2-bis(4-hydroxyphenyl)propane (generally called "bisphenol A") and methylene chloride. This polyformal resin, however, has a disadvantage in that its heat resistance is not sufficiently high: the glass transition temperature is 85° C. In connection with optical properties of the polyformal resin, its optical anisotropy is large, and the polyformal resin cannot be used as a material for production of optical instruments.

SUMMARY OF THE INVENTION

The present invention is intended to overcome the problems of the conventional polyformal resins, and an object of the present invention is to provide novel polyformal resins which have high heat resistance and also are excellent in optical properties.

Another object of the present invention is to provide a process for efficiently producing the above novel polyformal resins.

The present invention relates to polyformal resins having a repeating unit represented by the general formula (I):

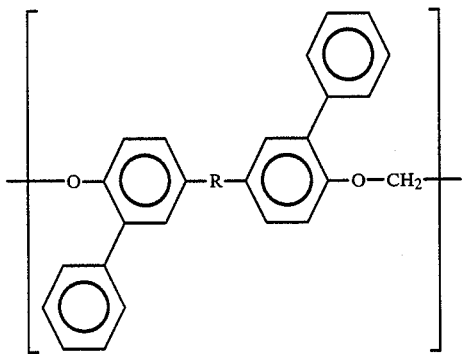

(wherein R is

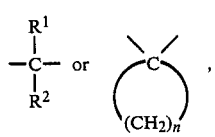

said $R^1$ and $R^2$ being each a hydrogen atom, an alkyl group having 1 to 5 carbon atoms, an aryl group having 6 to 12 carbon atoms, an alkoxyphenyl group having 7 to 11 carbon atoms, or a phenoxyphenyl group, and n being an integer of 4 to 10), and an intrinsic viscosity at 20° C. as a methylene chloride solution of at least 0.2 deciliter per gram (dl/g).

Moreover the present invention relates to a process for producing the above polyformal resins which comprises reacting dihydric phenols represented by the general formula (A):

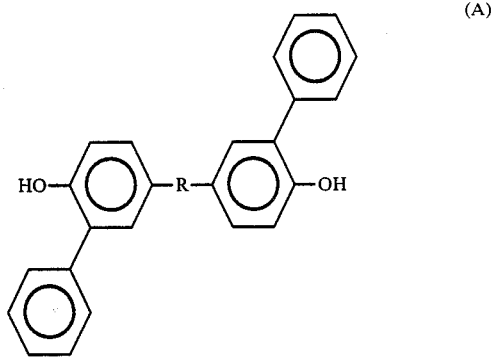

(wherein R is the same as defined above) and methylene halide.

DESCRIPTION OF PREFERRED EMBODIMENTS

The polyformal resins of the present invention have a repeating unit represented by the above general formula (I). In the general formula (I), R is

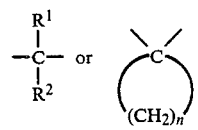

in which $R^1$ and $R^2$ are, as described above, each a hydrogen atom, an alkyl group having 1 to 5 carbon atoms (e.g., a methyl group, an ethyl group, a propyl group, a butyl group and a pentyl group), an aryl group having 6 to 12 carbon atoms (e.g., a phenyl group, a tolyl group, a xylyl group and a biphenylyl group), an alkoxyphenyl group having 7 to 11 carbon atoms (e.g., a methoxyphenyl group, and ethoxyphenyl group and a propoxyphenyl group), or a phenoxyphenyl group, and n is an integer of 4 to 10.

That is, when R is

the general formula (I) can be rewritten as the general formula (I'):

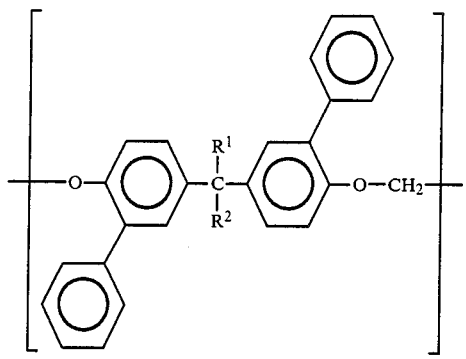

(I')

when R is

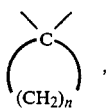

the general formula (I) can be rewritten as the general formula (I''):

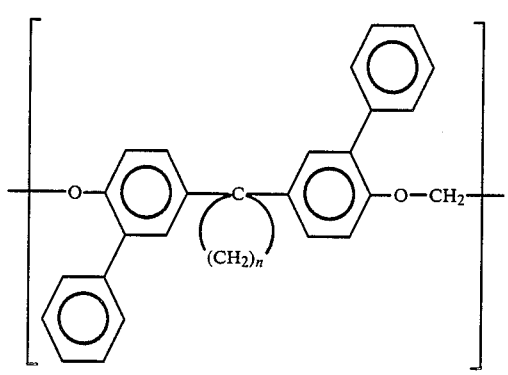

(I'')

(wherein n is an integer of 4 to 10).

The polyformal resins of the present invention may have, as well as the repeating unit of the general formula (I), not more than 50% by mole, preferably not more than 20% by mole of other repeating units, for example, a repeating unit represented by the general formula (II):

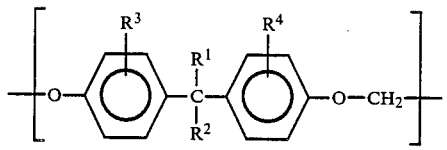

(II)

(wherein $R^1$ and $R^2$ are the same as defined above, and $R^3$ and $R^4$ are each a hydrogen atom, an alkyl group having 1 to 5 carbon atoms or a halogen atom).

The other essential feature of the polyformal resins of the present invention is that the intrinsic viscosity (solvent: methylene chloride; temperature: 20° C.) is at least 0.2 dl/g and preferably 0.3 to 2.0 dl/g.

The polyformal resins of the present invention can be produced efficiently by the process of production of the present invention as described above, although they can be produced by other methods.

In accordance with the process of the present invention, the dihydric phenols of the general formula (A) and methylene halide are reacted. The dihydric phenol to be used is chosen corresponding to the repeating unit of the general formula (I) which is a main structural unit of the polyformal resin of the present invention.

Examples of the dihydric phenols are bis(3-phenyl-4-hydroxyphenyl)methane; 1,1-bis(3-phenyl-4-hydroxyphenyl)ethane; 1,1-bis(3-phenyl-4-hydroxyphenyl)propane; 1,1-bis(3-phenyl-4-hydroxyphenyl)butane; 1,1-bis(3-phenyl-4-hydroxyphenyl)pentane; 1,1-bis(3-phenyl-4-hydroxyphenyl)hexane; 2,2-bis(3-phenyl-4-hydroxyphenyl)propane; 2,2-bis(3-phenyl-4-hydroxyphenyl)butane; 2,2-bis(3-phenyl-4-hydroxyphenyl)pentane; 2,2-bis(3-phenyl-4-hydroxyphenyl)4-methylpentane; 3,3-bis(3-phenyl-4-hydroxyphenyl)pentane; 2,2-bis(3-phenyl-4-hydroxyphenyl)3-methylbutane; 2,2-bis(3-phenyl-4-hydroxyphenyl)hexane; 3,3-bis(3-phenyl-4-hydroxyphenyl)hexane; 2,2-bis(3-phenyl-4-hydroxyphenyl)heptane; 3,3-bis(3-phenyl-4-hydroxyphenyl)heptane; 4,4-bis(3-phenyl-4-hydroxyphenyl)heptane; 3,3-bis(3-phenyl-4-hydroxyphenyl)octane; 4,4-bis(3-phenyl-4-hydroxyphenyl)octane; 4,4-bis(3-phenyl-4-hydroxyphenyl)nonane; 5,5-bis(3l-phenyl-4-hydroxyphenyl)nonane; 5,5-bis(3-phenyl-4-hydroxyphenyl)decane; 6,6-bis(3-phenyl-4-hydroxyphenyl)undecane; 1,1-bis(3-phenyl-4-hydroxyphenyl)cyclopentane; 1,1-bis(3-phenyl-4-hydroxyphenyl)cyclohexane; 1,1-bis(3-phenyl-4-hydroxyphenyl)cycloheptane; 1,1-bis(3-phenyl-4-hydroxyphenyl)cyclooctane; 1,1-bis(3-phenyl-4-hydroxyphenyl)cyclononane; 1,1-bis(3-phenyl-4-hydroxyphenyl)cyclodecane; 1,1-bis(3-phenyl-4-hydroxyphenyl)cycloundecane; 1-phenyl-1,1-bis(3-phenyl-4-hydroxyphenyl)methane; 1-phenyl-1,1-bis(3-phenyl-4-hydroxyphenyl)ethane; 1-phenyl-1,1-bis(3-phenyl-4-hydroxyphenyl)propane; 1-phenyl-1,1-bis(3-phenyl-4-hydroxyphenyl)butane; 1-phenyl-1,1-bis(3-phenyl-4-hydroxyphenyl)pentane; 1-phenyl-1,1-bis(3-phenyl-4-hydroxyphenyl)hexane; 1,1-diphenyl-1,1-bis(3-phenyl-4-hydroxyphenyl)methane; 1-tolyl-1,1-bis(3-phenyl-4-hydroxyphenyl)methane; 1-tolyl-1,1-bis(3-phenyl-4-hydroxyphenyl)ethane; 1-tolyl-1,1-bis(3-phenyl-4-hydroxyphenyl)propane; 1-tolyl-1,1-bis(3-phenyl-4-hydroxyphenyl)butane; 1-tolyl-1,1-bis(3-phenyl-4-hydroxyphenyl)pentane; 1-tolyl-1,1-bis(3-phenyl-4-hydroxyphenyl)hexane; 1,1-ditolyl-1,1-bis(3-phenyl-4-hydroxyphenyl)methane; 1-xylyl-1,1-bis(3-phenyl-4-hydroxyphenyl)methane; 1-xylyl-1,1-bis(3-phenyl-4-hydroxyphenyl)ethane; 1-xylyl-1,1-bis(3-phenyl-4-hydroxyphenyl)propane; 1-xylyl-1,1-bis(3-phenyl-4-hydroxyphenyl)butane; 1-xylyl-1,1-bis(3-phenyl-4-hydroxyphenyl)pentane; 1-xylyl-1,1-bis(3-phenyl-4-hydroxyphenyl)hexane; 1,1-dixylyl-1,1-bis(3-phenyl-4-hydroxyphenyl)methane; 1-biphenylyl-1,1-bis(3-phenyl-4-hydroxyphenyl)ethane; 1-(4-methoxyphenyl)-1,1-bis(3-phenyl-4-hydroxyphenyl)methane; 1-(4-methoxyphenyl)-1,1-bis(3-phenyl-4-hydroxyphenyl)ethane; 1-(4-methoxyphenyl)-1,1-bis(3-phenyl-4-hydroxyphenyl)propane; 1-(4-methoxyphenyl)-1,1-bis(3-phenyl-4-hydroxyphenyl)butane; 1-(4-methoxyphenyl)-1,1-bis(3-phenyl-4-hydroxyphenyl)pentane; 1-(4-methoxyphenyl)-1,1-bis(3-phenyl-4-hydroxyphenyl)hexane; 1,1-bis(4-methoxyphenyl)-1,1-bis(3-phenyl-4-hydroxyphenyl)methane; 1-(4-ethoxyphenyl)-1,1-bis(3-phenyl-4-hydroxyphenyl)methane; 1-(4-ethoxyphenyl)-1,1-bis(3-phenyl-4-hydroxyphenyl)ethane; 1-(4-ethoxyphenyl)-1,1-bis(3-phenyl-4-hydroxyphenyl)propane; 1-(4-ethoxyphenyl)-1,1-bis(3-phenyl-4-hydroxyphenyl)butane; 1-(4-ethoxyphenyl)-1,1-bis(3-phenyl-4-hydroxyphenyl)pentane; 1-(4-ethoxyphenyl)-1,1-bis(3-phenyl-4-hydroxyphenyl)hexane; 1,1-bis(4-methoxyphenyl)-1,1-bis(3-phenyl-4-hydroxyphenyl)methane; 1-(4-propoxyphenyl)-1,1-bis(3-phenyl-4-hydroxyphenyl)methane; 1-(4-propoxyphenyl)-1,1-bis(3-phenyl-4-hydroxyphenyl)ethane; 1-(4-propoxyphenyl)-1,1-bis(3-phenyl-4-hydroxyphenyl)propane; 1-(4-propoxyphenyl)-1,1-bis(3-phenyl-4-hydroxyphenyl)butane; 1-(4-propoxyphenyl)-1,1-bis(3-phenyl-4-hydroxyphenyl)pentane; 1-(4-propoxyphenyl)-1,1-bis(3-phenyl-4-hydroxyphenyl)hexane; 1,1-bis(4-propoxyphenyl)-1,1-bis(3-phenyl-4-hydroxyphenyl)methane; 1-(4-phenoxyphenyl)-1,1-bis(3-phenyl-4-hydroxyphenyl)methane; 1-(4-phenoxyphenyl)-1,1-bis(3-phenyl-4-hydroxyphenyl)ethane; 1-(4-phenoxyphenyl)-1,1-bis(3-phenyl-4-hydroxyphenyl)propane; 1-(4-phenoxyphenyl)-1,1-bis(3-phenyl-4-hydroxyphenyl)butane; 1-(4-phenoxyphenyl)-1,1-bis(3-phenyl-4-hydroxyphenyl)pentane; 1-(4-phenoxyphenyl)-1,1-bis(3-phenyl-4-hydroxyphenyl)hexane.

The methylene halide to be reacted with the above dihydric phenols can be represented by the general formula: $CH_2X_2$ (wherein X is a halogen atom). Specific examples of the methylene halide are methylene chloride, methylene bromide and methylene iodide.

The reaction between the dihydric phenol of the general formula (A) and the methylene halide is usually carried out in a solvent, such as N-methylpyrrolidone, tetrahydrofuran, dimethylsulfoxide, N,N-dimethylformamide, acetonitrile, 1,3-dimethyl-2-imidazolidinone and sulforane, if desired in the presence of alkali hydroxide, such as sodium hydroxide and potassium hydroxide, a suitable catalyst, a molecular weight controlling agent and so on, at a temperature of 30° to 100° C., preferably 40° to 100° C. for 1 to 24 hours.

As the above molecular weight controlling agent, various phenols, specifically phenol, alkylphenol (e.g., p-tert-butylphenol, p-octylphenol and p-nonylphenol), 2-phenyl-2-(4-hydroxyphenyl)propane and p-phenylphenol can be used.

Without use of the molecular weight controlling agent as described above, the degree of polymerization of the polyformal resin can be controlled so that the intrinsic viscosity falls within the range of at least 0.2 dl/g, by appropriately choosing the amount of the methylene halide used or adjusting the reaction temperature.

In the above reaction, it is effective to use as the dihydric phenol component, in combination with the dihydric phenols of the general formula (A), not more than 50% by mole, preferably not more than 20% by mole based on the total of the dihydric phenol component of dihydric phenols represented by the general formula (B):

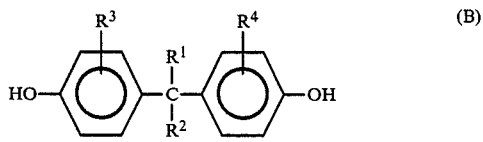

(wherein $R^1$ to $R^4$ are the same as defined above). In this case; that is, when the dihydric phenols of the general formula (A) and the dihydric phenols of the general formula (B) are used in combination with each other, copolymers having the repeating unit of the general formula (I) and the repeating unit of the general formula (II) result.

As described above, the polyformal resins of the present invention have satisfactorily high heat resistance and also are excellent in optical properties and, therefore, can be used not only as materials for production of optical instruments but also as materials for production of electric or electronic devices, mechanical parts and so on.

When the polyformal resins of the present invention are used in applications other than the optical instruments, it is effective to appropriately compound thereto other thermoplastic resins such as polycarbonates, polyesters and polysulfones. In addition, glass fibers, carbon fibers, fillers such as silicon carbide and silicon oxide, stabilizers, pigments, flame retardants and so on can be compounded to the polyformal resins of the present invention.

The present invention is described in greater detail with reference to the following examples.

EXAMPLE 1

Into a reactor placed were 190 g (0.5 mole) of 2,2-bis(3-phenyl-4-hydroxyphenyl)propane, 44 g (1.1 mole) of sodium hydroxide, 51 g (0.6 mole) of methylene chloride and 500 milliliters (ml) of N-methylpyrrolidone as a solvent and the resulting mixture was reacted at the reflux temperature of the methylene chloride for 4 hours while stirring. After the completion of the reaction, the reaction mixture was cooled, diluted with 2 liters of methylene chloride, and washed with 0.01 normal (N) hydrochloric acid and water. The resulting organic layer was isolated and poured into methanol to deposit and recover a polyformal resin.

The yield of the polyformal resin was 183 g. The intrinsic viscosity [$\eta$] of the polyformal resin as determined from reduced viscosities [$\eta_{red}/c$] at 20° C. of solutions of methylene chloride as solvent in the concentrations of 0.5 g/dl, 0.4 g/dl and 0.3 g/dl was 0.47 dl/g. The glass transition temperature of the polyformal resin was 120° C. A proton nuclear magnetic resonance spectral ($^1$H-NMR) analysis (tetramethylsilane (TMS) as a base substance) of the polyformal resin showed: 1.65 (s, 6H), 5.48 (s, 2H), and 7.0–7.5 (m, 16H). These data confirmed that the polyformal resin had a repeating unit having the following formula:

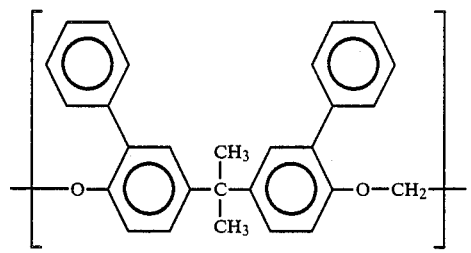

The polyformal resin was molded into a bar flow molding by the use of MINI-MAT molding machine (manufactured by Sumitomo Juki Co., Ltd.). The birefringence of the molding at various points was measured; the average birefringence was 120 nm.

EXAMPLE 2

In the same manner as in Example 1 except that 221 g (0.5 mole) of 1-phenyl-2,2-bis(3-phenyl-4-hydroxyphenyl)ethane was used as the dihydric phenol, 215 g of a polyformal resin was obtained.

The intrinsic viscosity [η] was 0.49 dl/g, and the glass transition temperature was 149° C. A proton nuclear magnetic resonance (¹H-NMR) spectral analysis (TMS as a base substance) showed: 2.18 (s, 3H), 5.48 (s, 2H) and 6.8-7.6 (m, 21H). These data confirmed that the polyformal resin had a repeating unit having the following formula:

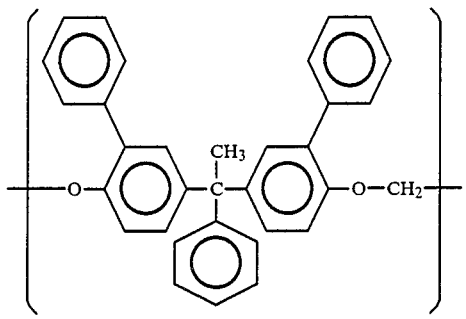

The average birefringence was 105 nm.

EXAMPLE 3

In the same manner as in Example 1 except that 267 g (0.5 mole) of 1-(4-phenoxyphenyl)-1,1-bis(3-phenyl-4-hydroxyphenyl)ethane was used as the dihydric phenol, 252 g of a polyformal resin was obtained.

The intrinsic viscosity [η] was 0.42 dl/g, and the glass transition temperature was 139° C. A proton nuclear magnetic resonance (¹H-NMR) analysis (TMS as a base substance) showed: 2.18 (s, 3H), 5.48 (s, 2H) and 6.7-7.9 (m, 25H). These data confirmed that the polyformal resin had a repeating unit having the following formula:

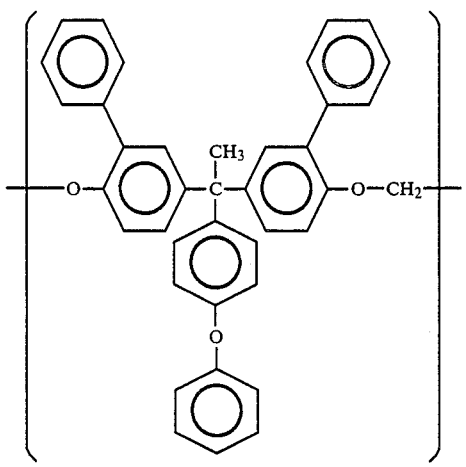

The average birefringence of the polyformal resin was 100 nm.

EXAMPLE 4

In the same manner as in Example 1 except that 216 g (0.5 mole) of 1,1-bis(3-phenyl-4-hydroxyphenyl)cyclohexane was used as the dihydric phenol, 208 g of a polyformal resin was obtained.

The intrinsic viscosity [η] was 0.52 dl/g, and the glass transition temperature was 131° C. A proton nuclear magnetic resonance (¹H-NMR) spectral analysis (TMS as a base substance) showed: 1.2-2.3 (m, 10H), 5.5 (s, 2H), 6.7-7.3 (m, 16H). These data confirmed that the polyformal resin had a repeating unit having the following formula:

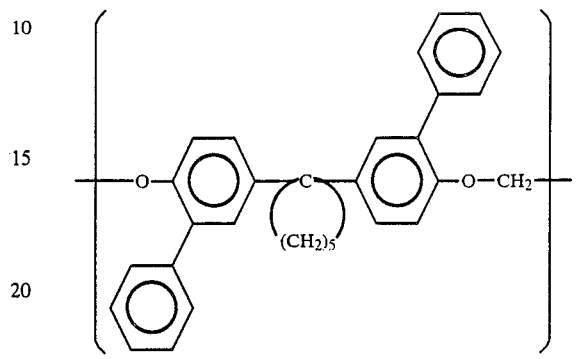

The average birefringence of the polyformal resin was 86 nm.

COMPARATIVE EXAMPLE 1

In the same manner as in Example 1 except that 114 g of 2,2-bis(4-hydroxyphenyl)propane (bisphenol A) was used as the dihydric phenol, 105 g of a polyformal resin was obtained.

The intrinsic viscosity [η] was 0.54 dl/g, the glass transition temperature was 86° C., and the repeating unit was as follows:

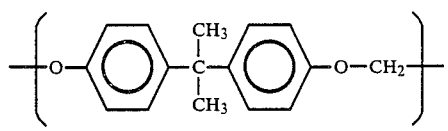

The birefringence was 375 nm.

What is claimed is:

1. A polyformal resin having a repeating unit represented by the general formula:

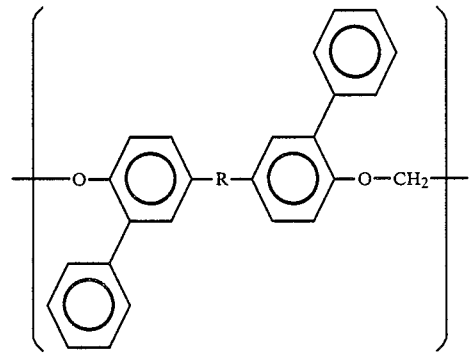

wherein R is

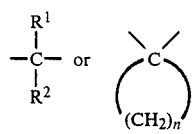

said $R^1$ and $R^2$ being each a hydrogen atom, an alkyl group having 1 to 5 carbon atoms, an aryl group having 6 to 12 carbon atoms, an alkoxyphenyl group having 7 to 11 carbon atoms or a phenoxyphenyl group, and n being an integer of 4 to 10, and an intrinsic viscosity at 20° C. as a methylene chloride solution of at least 0.2 dl/g.

2. A process for producing a polyformal resin having a repeating unit represented by the general formula:

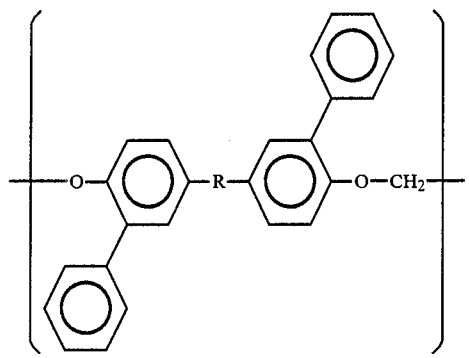

wherein R is

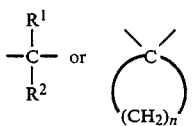

said $R^1$ and $R^2$ being each a hydrogen atom, an alkyl group having 1 to 5 carbon atoms, an aryl group having 6 to 12 carbon atoms, an alkoxyphenyl group having 7 to 11 carbon atoms or a phenoxyphenyl group, and n being an integer of 4 to 10, and an intrinsic viscosity as 20° C. as a methylene chloride solution of at least 0.2 dl/g, which process comprises reacting dihydric phenyl represented by the general formula:

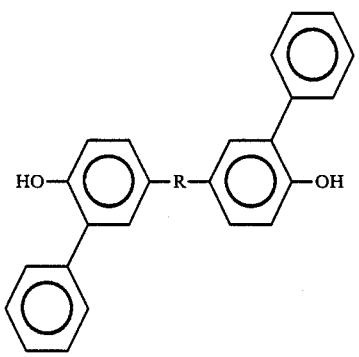

wherein R is the same as defined above, and methylene halide.

3. The polyformal resin as claimed in claim 1 wherein said repeating unit is represented by the general formula:

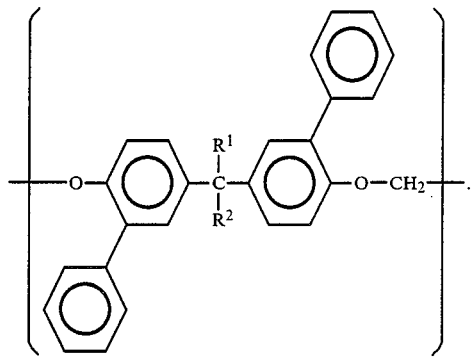

4. The polyformal resin as claimed in claim 1 wherein said repeating unit is presented by the general formula:

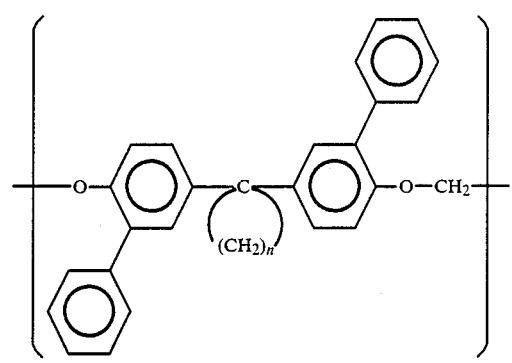

5. The polyformal resin as claimed in claim 1 wherein the intrinsic viscosity at 20° C. as a methylene chloride solution is from 0.3 to 2.0 dl/g.

6. The polyformal resin as claimed in claim 1 wherein said repeating unit is represented by the formula:

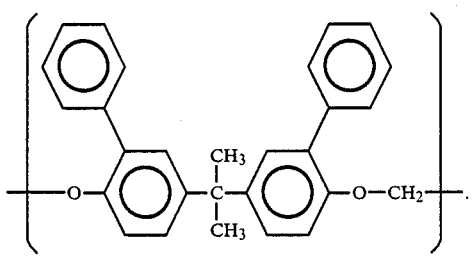

7. The polyformal resin as claimed in claim 1 wherein said repeating unit is represented by the formula:

8. The polyformal resin as claimed in claim 1 wherein said repeating unit is represented by the formula:
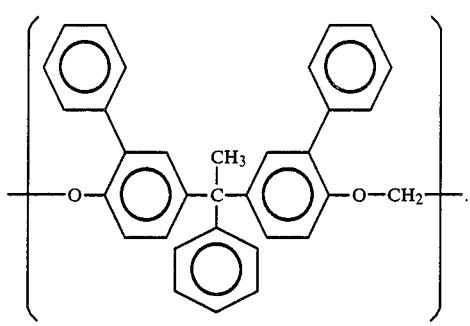
9. The polyformal resin as claimed in claim 1 wherein said repeating unit is represented by the formula:
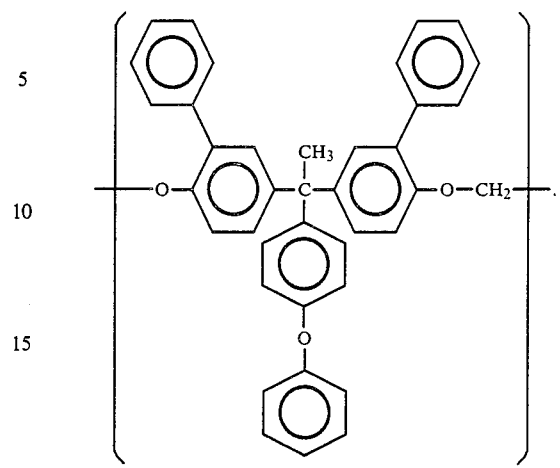
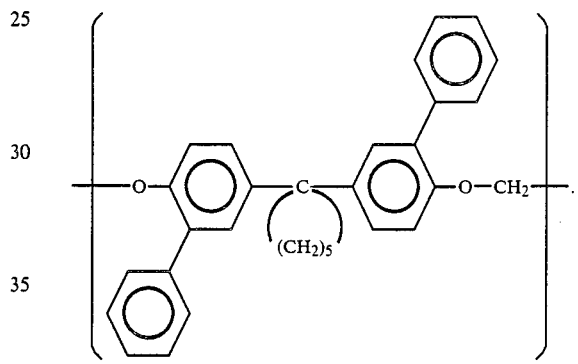
* * * * *